US007949993B2

(12) United States Patent
Milligan

(10) Patent No.: US 7,949,993 B2
(45) Date of Patent: May 24, 2011

(54) METHOD AND SYSTEM FOR PROVIDING A VISUAL CONTEXT FOR SOFTWARE DEVELOPMENT PROCESSES

(75) Inventor: Andrew P. Milligan, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 1212 days.

(21) Appl. No.: 11/564,259

(22) Filed: Nov. 28, 2006

(65) Prior Publication Data

US 2008/0127051 A1 May 29, 2008

(51) Int. Cl.
*G06F 9/44* (2006.01)

(52) U.S. Cl. ........ 717/105; 717/100; 717/109; 717/113; 707/805; 715/208

(58) Field of Classification Search .......... None
See application file for complete search history.

(56) References Cited

U.S. PATENT DOCUMENTS

| | | | | |
|---|---|---|---|---|
| 5,729,253 A * | 3/1998 | Mashita et al. | ........... | 715/763 |
| 5,826,086 A * | 10/1998 | Arima et al. | ........... | 717/105 |
| 5,974,257 A * | 10/1999 | Austin | ........... | 717/125 |
| 6,091,893 A * | 7/2000 | Fintel et al. | ........... | 703/6 |
| 6,226,784 B1 * | 5/2001 | Holmes et al. | ........... | 717/100 |
| 6,268,853 B1 * | 7/2001 | Hoskins et al. | ........... | 700/83 |
| 6,286,017 B1 * | 9/2001 | Egilsson | ........... | 715/207 |
| 6,292,830 B1 * | 9/2001 | Taylor et al. | ........... | 709/224 |
| 6,370,681 B1 * | 4/2002 | Dellarocas et al. | ........... | 717/110 |
| 6,434,562 B1 * | 8/2002 | Pennywitt et al. | ........... | 1/1 |
| 6,621,505 B1 * | 9/2003 | Beauchamp et al. | ........... | 715/764 |
| 6,738,964 B1 * | 5/2004 | Zink et al. | ........... | 717/105 |
| 6,795,089 B2 | 9/2004 | Rajarajan et al. | | |
| 6,901,409 B2 | 5/2005 | Dessloch et al. | | |
| 6,993,590 B1 * | 1/2006 | Gauthier et al. | ........... | 709/231 |
| 7,017,146 B2 * | 3/2006 | Dellarocas et al. | ........... | 717/106 |
| 7,038,680 B2 * | 5/2006 | Pitkow | ........... | 345/440 |
| 7,093,264 B2 * | 8/2006 | Choi et al. | ........... | 719/316 |
| 7,120,643 B2 * | 10/2006 | Dill | ........... | 1/1 |
| 7,487,079 B2 * | 2/2009 | Benny et al. | ........... | 703/22 |
| 7,590,972 B2 * | 9/2009 | Axelrod et al. | ........... | 717/117 |
| 7,814,470 B2 * | 10/2010 | Mamou et al. | ........... | 717/162 |
| 7,844,640 B2 * | 11/2010 | Bender et al. | ........... | 707/805 |
| 2002/0083097 A1 * | 6/2002 | Warrington | ........... | 707/513 |
| 2002/0188430 A1 * | 12/2002 | Benny et al. | ........... | 703/7 |
| 2003/0122867 A1 * | 7/2003 | Choi et al. | ........... | 345/748 |
| 2003/0126050 A1 | 7/2003 | Theiss et al. | | |
| 2004/0015833 A1 | 1/2004 | Dellarocas et al. | | |
| 2004/0098392 A1 * | 5/2004 | Dill | ........... | 707/100 |

(Continued)

OTHER PUBLICATIONS

Title: User Perspectives on a Visual Aid to Program Comprehension, author: Cox et al, source: IEEE, dated: Oct. 9, 2006.*

(Continued)

*Primary Examiner* — Chameli C Das
(74) *Attorney, Agent, or Firm* — Sawyer Law Group, P.C.

(57) ABSTRACT

A unified architectural diagram that contains links to different kinds of information (a new map) extends the functionality of current standardized development architectural diagrams by linking information to each component of the solution. The new map offers software development processes without architectural diagrams a new centralized, visual representation of every component and process that comprise a large software solution as well as how those components and processes are connected to each other within the solution, offering an opportunity for understanding at an individual level that otherwise would be impractical.

16 Claims, 10 Drawing Sheets

U.S. PATENT DOCUMENTS

| | | |
|---|---|---|
| 2004/0153509 A1 | 8/2004 | Alcorn et al. |
| 2004/0181771 A1 | 9/2004 | Anonsen et al. |
| 2005/0022115 A1* | 1/2005 | Baumgartner et al. ....... 715/513 |
| 2005/0039123 A1 | 2/2005 | Kuchinsky et al. |
| 2005/0120332 A1 | 6/2005 | Martin et al. |
| 2005/0125768 A1 | 6/2005 | Wong et al. |
| 2005/0131657 A1* | 6/2005 | Sean Mei ........................... 703/1 |
| 2005/0182647 A1* | 8/2005 | Saenz et al. ....................... 705/1 |
| 2006/0069717 A1* | 3/2006 | Mamou et al. ................ 709/203 |
| 2006/0095276 A1* | 5/2006 | Axelrod et al. ................... 705/1 |
| 2006/0122882 A1* | 6/2006 | Brown et al. ................... 705/14 |
| 2007/0202890 A1* | 8/2007 | Feher ......................... 455/456.1 |
| 2010/0131922 A1* | 5/2010 | Shenfield et al. ............. 717/107 |

OTHER PUBLICATIONS

Title: Web page reuse techniques: a dynamic referential navigational guide, author: Eng Huat Ng et la, source: IEEE, dated: Sep. 5, 2000.*
Hideo Funaoi et al., Collaborative Concept Mapping Software to Reconstruct Learning Process, International Conference on Computers in Education, Jun. 2002, pp. 1-5, 0-7695-1509, IEEE Computer Society.

* cited by examiner

800'

METHOD AND SYSTEM FOR PROVIDING A VISUAL CONTEXT FOR SOFTWARE DEVELOPMENT PROCESSES

FIELD OF THE INVENTION

The present invention relates generally to software development processes and more specifically to a method and system for mapping different kinds of information into one process.

BACKGROUND OF THE INVENTION

Established software development processes like IBM's Iterative Rational Unified Process (IRUP) currently create and deliver architectural diagrams. However, architectural diagrams like those provided through IRUP serve only a limited audience within the software development process (i.e., the diagrams speak primarily to software engineers responsible for the development of the code that makes up the solution. They are not intended for other members of the development process such as quality assurance (QA) engineers, information developers, professional services, sales/technical sales, marketing, and customers).

When developing large software projects, such as open source or enterprise solutions, the size and scope of all of the processes and components that make up a solution and how those processes and components are connected and interact, can become extremely difficult for any single person to comprehend. The difficulty in comprehending what really makes up a solution lies in the unavailability of information about those components and processes and how they interact with each other.

Solutions without standardized development processes that produce architectural diagrams can be particularly difficult for a single person to understand.

Hybrid solutions that involve both standardized development processes which produce architectural diagrams (like IRUP), and non-standardized development processes, currently have no way to easily map the entire solution. There is no easy way to map non-standardized development processes alongside the standardized development efforts.

Accordingly, what is needed is a system and method for addressing these issues. The present invention addresses such a need.

SUMMARY OF THE INVENTION

A computer-implemented method and system for providing a visual context for a software development process is disclosed. The method and system comprise providing a unified architectural diagram. The diagram links at least two kinds of information including standardized development architectural information and non-standardized development architectural information. The diagram includes a storage area and a stencil area for representing components and links to different kinds of information and for generating a unified view of each represented component. The components and links can be dragged and dropped into the storage area. There is a hierarchy of the software development process and links assigned to relevant information. The content of the software development process can be published as a standard.

DETAILED DESCRIPTION

Figure 1:
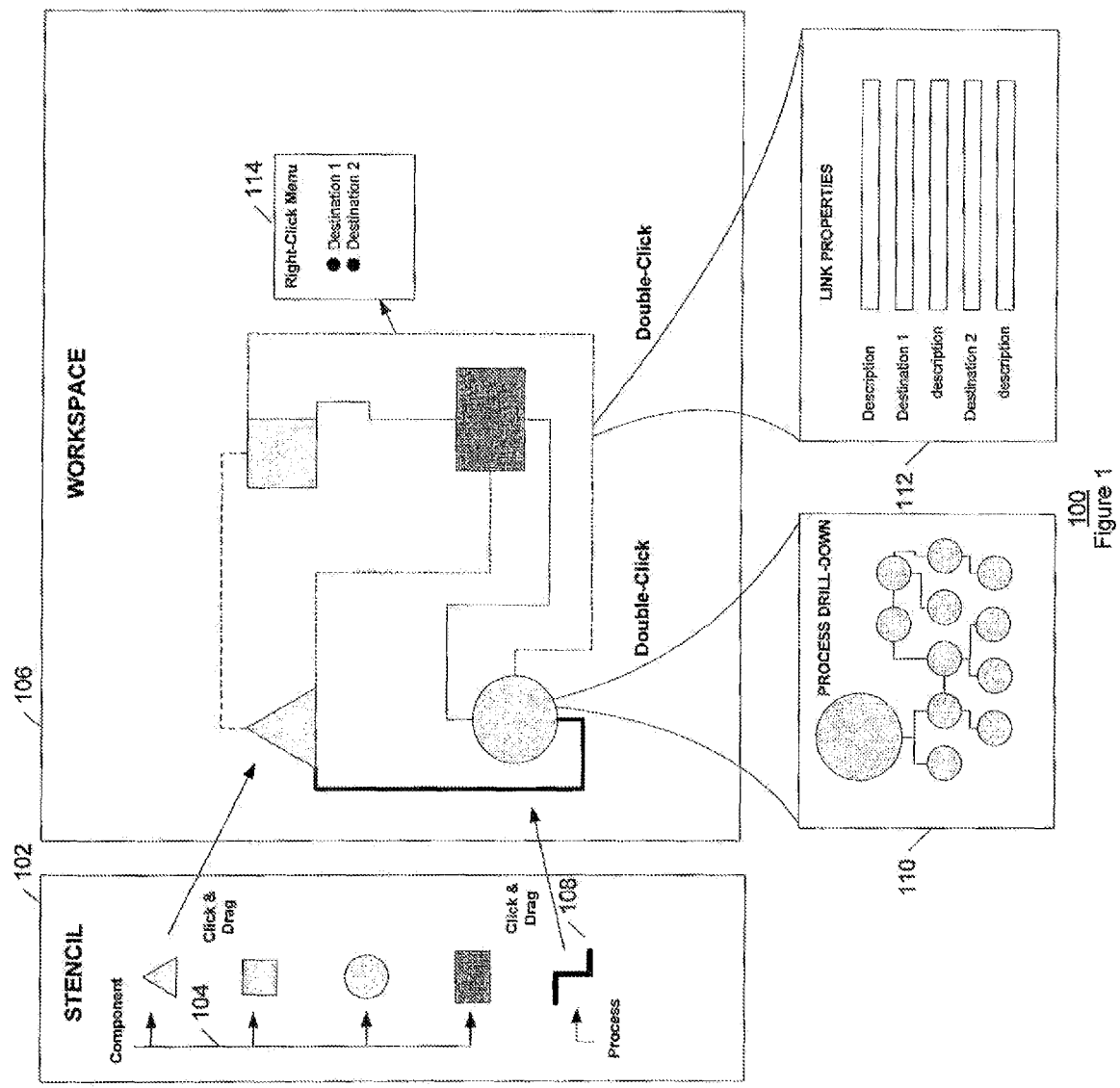
FIG. 1 illustrates an embodiment of a modeling tool for providing an architecture diagram.

The present invention relates generally to software development processes and more specifically to a method and system for mapping different kinds of information into one process. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A unified architectural diagram that contains links to different kinds of information (a new map) extends the functionality of current standardized development architectural diagrams by linking information to each component of the solution. The new map offers software development processes without architectural diagrams a new centralized, visual representation of every component and process that comprise a large software solution as well as how those components and processes are connected to each other within the solution, offering an opportunity for understanding at an individual level that otherwise would be impractical.

Furthermore, the map is capable of representing hybrid solutions that are developed using different software development processes (standardized or not).

The map offers a unified view of solutions created using different development methodologies.

Each component and process and connection in the diagram is a physical link to different kinds of information (each kind of information being targeted to a specific developer/consumer (audience).

The map serves as the base for delivering information to a wider audience than currently intended by existing architectural diagrams which are not linked to any information.

The map does not care what kind of information is attached to it, therefore it can be used by a variety of additional audiences not currently served by existing architectural diagrams.

Structure

A typical implementation comprises a source map that serves as the basis for a series of focused maps whose information is intended for a specific audience.

Delivery

Each link is a pointer to a specific URL/file path. Therefore, the target information can be delivered in its native form, assuming the target audience has a way to view and interpret that information. For example, if the focused map contains links to marketing information, that information could simply be delivered as a directory of PowerPoint presentation files which contain the related marketing information. In the case of a development team, a separate focused map can serve as a collection of links to libraries where the relevant code is housed. In the case of an information development team the map serves as a collection of links to relevant documentation. In quality assurance it may serve as a collection of links to relevant bugs and their solutions.

Maintenance

Maintaining the source map can be the responsibility of those responsible for the architecture of a solution. However, because the map is agnostic when it comes to what kind of information is attached to it, the responsibility for attaching information to a focused map, and maintaining the information attached to the focused map, falls to each of the development process participants (marketing, information development, sales, pro services, etc.)

Security

Access to the source map and to the information linked in each focused map can be secured or not using standard network security measures.

Value

It certainly seems to have value to manage open source development projects as well as information managed where the development pieces and parts are so numerous and disparate that a cohesive picture of what is usefully available is difficult to determine.

This might be a valuable tool to include with software development kits or other development products.

Overview

A method and system for mapping software components and processes and providing, a visual context for application development, understanding, and information delivery is disclosed. The method and system comprises providing a computer-implemented method that unifies an architectural diagram, linking at least two kinds of information including standardized development architectural diagrams and non-standardized development architectural diagrams and representing components in this information. The method and system includes generating a unified view of each represented component. The linking can refer to a URL path or to a computer file path. The method and system also provides for targeting to a specific audience.

The method and system also provides a new unified architectural diagram that contains links to different kinds of information, thereby extending the functionality of current standardized development architectural diagrams by linking information to each component of the solution, and also offering a new centralized and visual representation of every component and process.

The method and system also provides a map offering a unified view of solutions created using different development methodologies. Each component, process and connection in the diagram is a physical link to different kinds of information (each kind of information being target to a specific developer/consumer audience).

The method and system provide a map for serving as the base for delivering information to a wide audience which can be used by a variety of additional audiences not currently served by existing architectural diagrams, and provides the advantages of using the architectural diagrams (for application developers, quality assurance (QA) engineers, information developers, curriculum developers, pro-services, sales/technical sales, marketing, existing customers, new customers, and software management).

The method and system in one embodiment provide a web-based map or modeling tool where nodes and links are dragged and dropped into a work space, where the hierarchy of the process within the project is determined, and the links to the relevant information are assigned for providing that the content can be published and made available as a published diagram with linked information.

The method and system provides for a structure having a source map and a series of focused maps, a delivery method wherein each link is simply a pointer to a specific URL/file path, a maintenance mechanism for maintaining the source map, and a mechanism for securing the access to the source map and to the information linked in each focused map.

Implementation

Implementing the concept might appear as a web-based map-creation or modeling tool where nodes and links are dragged and dropped into a work space, and the hierarchy of the process within the project is determined, and links to the related information are assigned. That content can then be published and made available as xhtml or some other web-based standard. The implementation can be as simple or robust as a solution developer wants to make it.

FIG. 1 illustrates an embodiment of a modeling tool 100 for providing an architecture diagram. The display of the modeling tool 100 comprises a stencil menu 102 and a workspace 106 which comprises a component area 104 and process area 108. The workspace menu 106 comprises various links. Double-clicking on one link in the workspace menu 106 will open a process drill-down menu 110. Double-clicking on another part of the workspace menu 106 will open a link properties box 112. Right-clicking a portion of the workspace menu 106 will open designations 1 and 2 114.

An import feature to translate standardized architectural diagrams (like those produced by IRUP) would be extremely valuable to the overall implementation of this idea.

To describe the features of the present invention in more detail, refer now to the following description in conjunction with the accompanying description.

Figure 2:
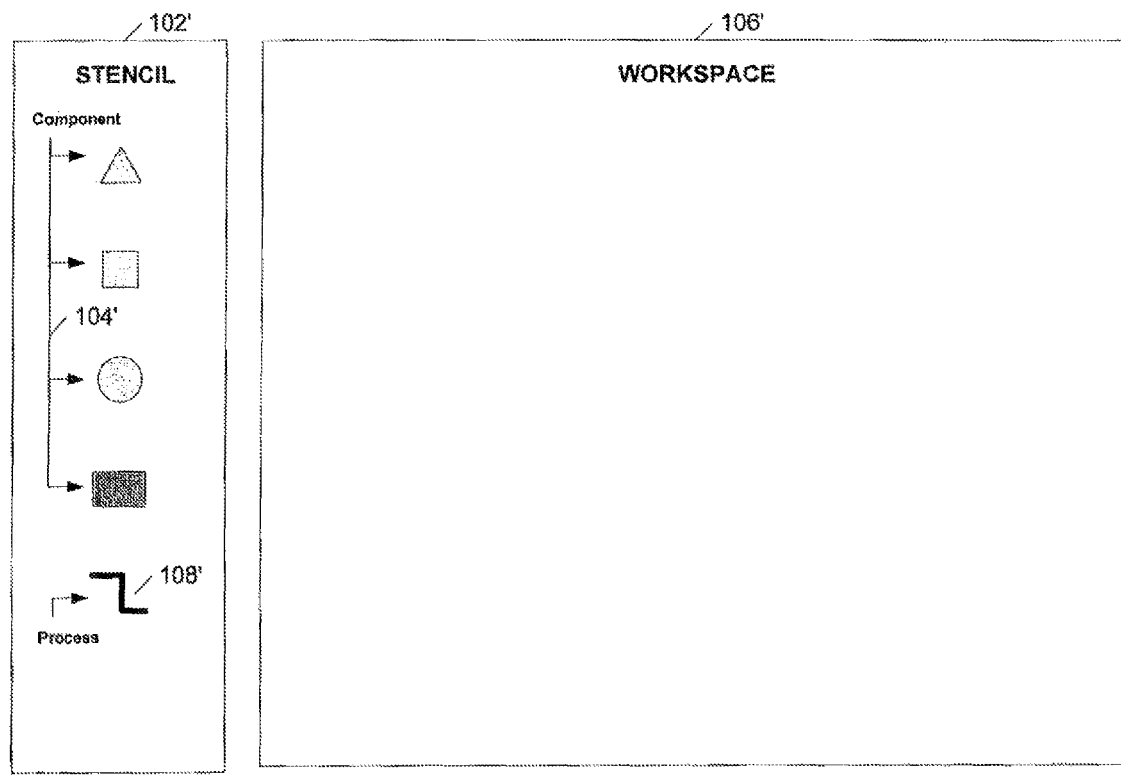
FIG. 2 illustrates a modeling tool with the workspace area and the stencil.

FIG. 2 illustrates a modeling tool 100' with the workspace area 106' and the stencil area 102'. As is seen, the stencil area 102' includes a plurality of components 104' and processes 108'.

Figure 3:
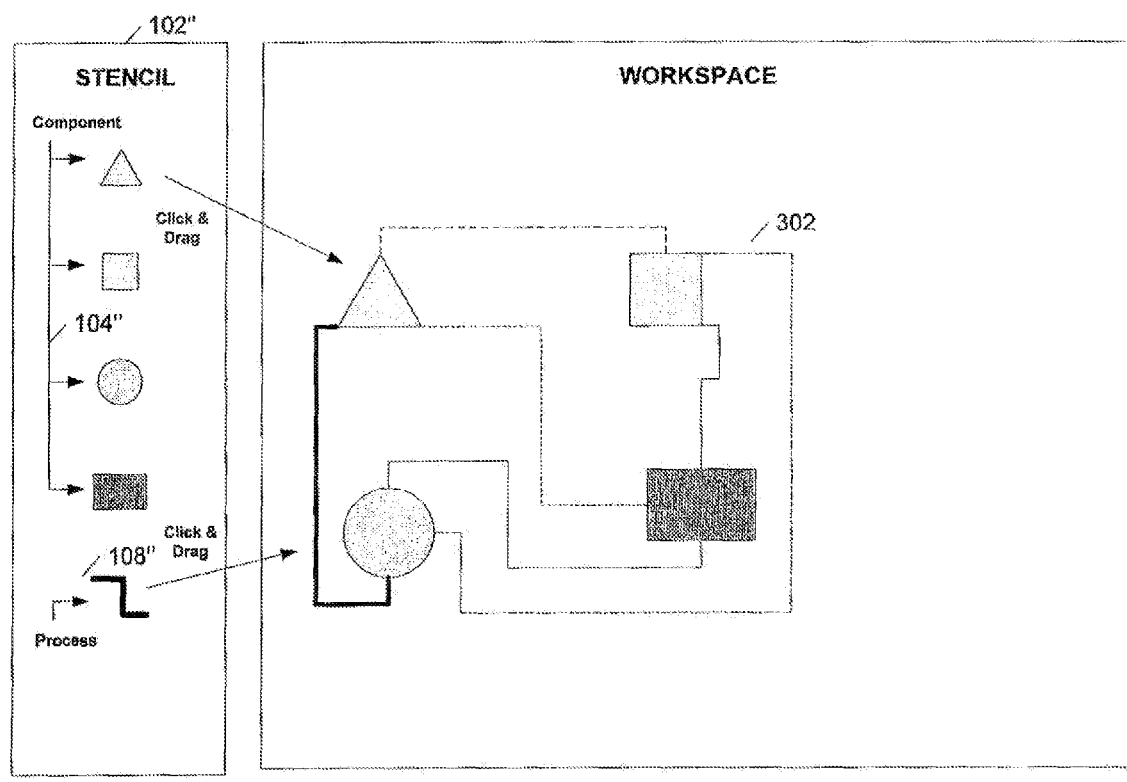
FIG. 3 illustrates adding a diagram utilizing the components and the processes from the stencil to provide a published diagram with linked information.

FIG. 3 illustrates adding a diagram 302 utilizing the components 104" and the processes 108" from the stencil 102" to provide a published diagram 302 with linked information.

Figure 4:
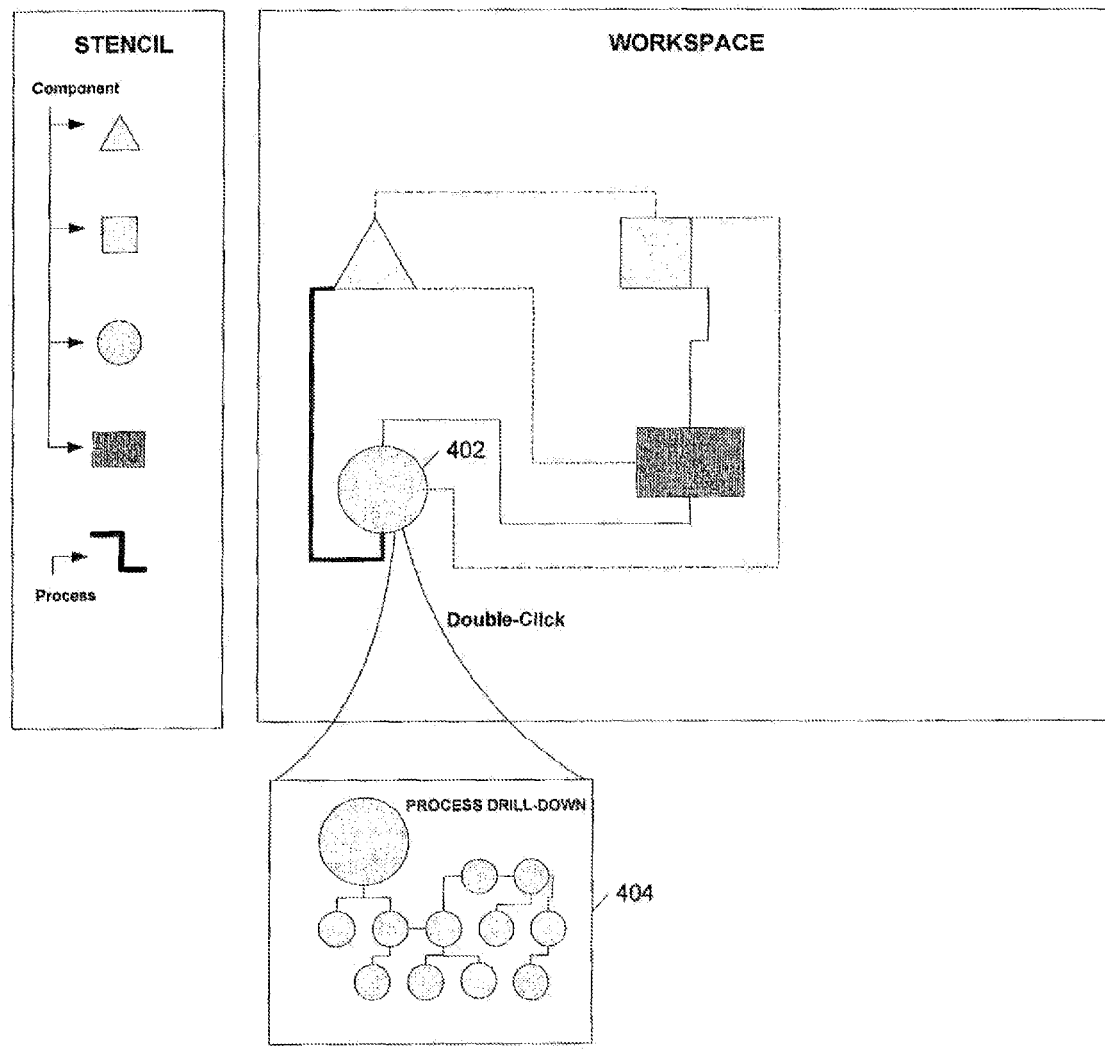
FIG. 4 illustrates a double click circle.

FIG. 4 illustrates the process of double clicking on a circle. By double clicking on a circle 402, more detailed information 404 about the component is provided.

Figure 5:
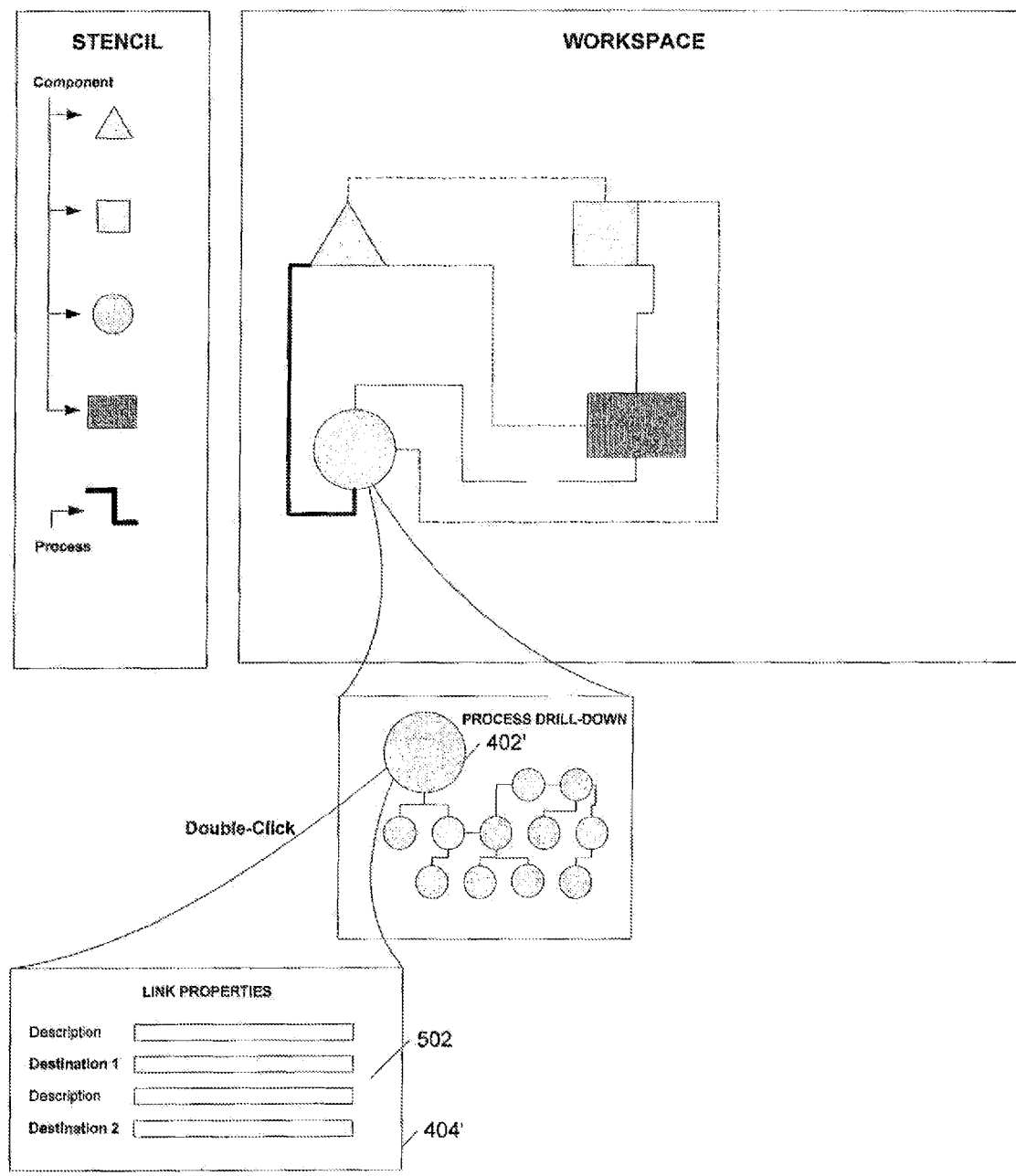
FIG. 5 illustrates the show link properties process.

FIG. 5 illustrates clicking on a circle 402' within the detailed information link. By clicking on a circle 402' within the detailed information link 404', link properties 502 are shown.

Figure 6:
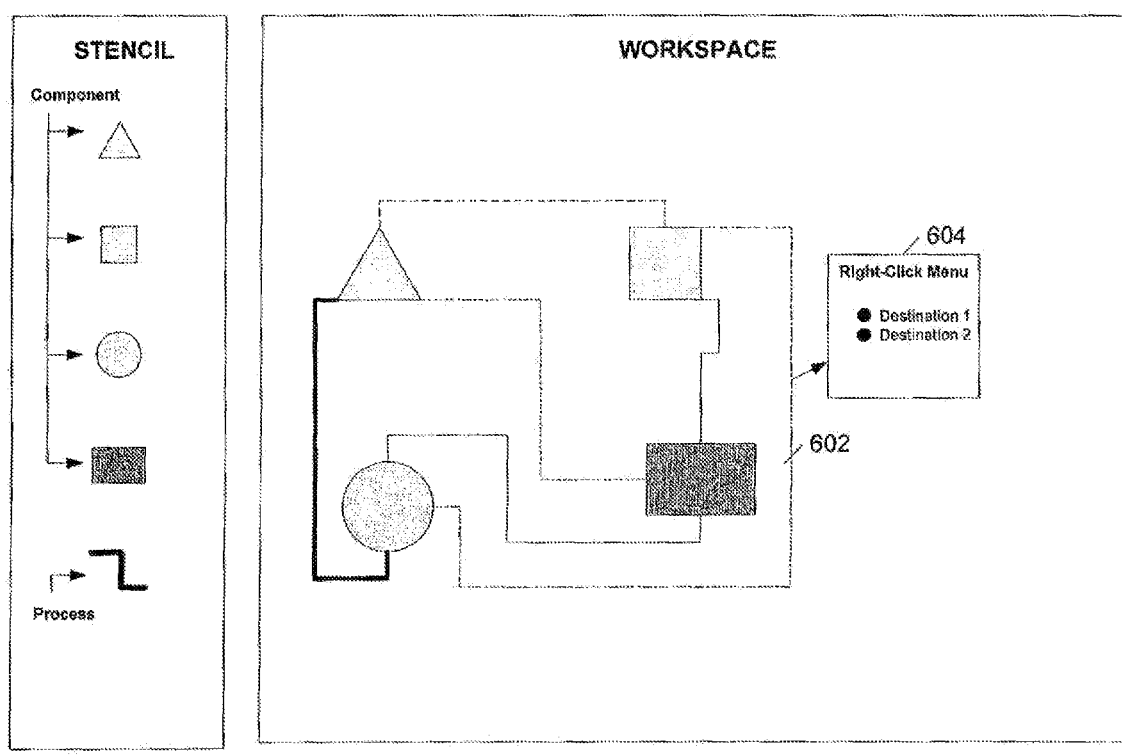
FIG. 6 illustrates the right click preview process.

FIG. 6 illustrates right clicking on a link 602. A right click on a link shows a preview of the information 604 relating to that link.

Figure 7:
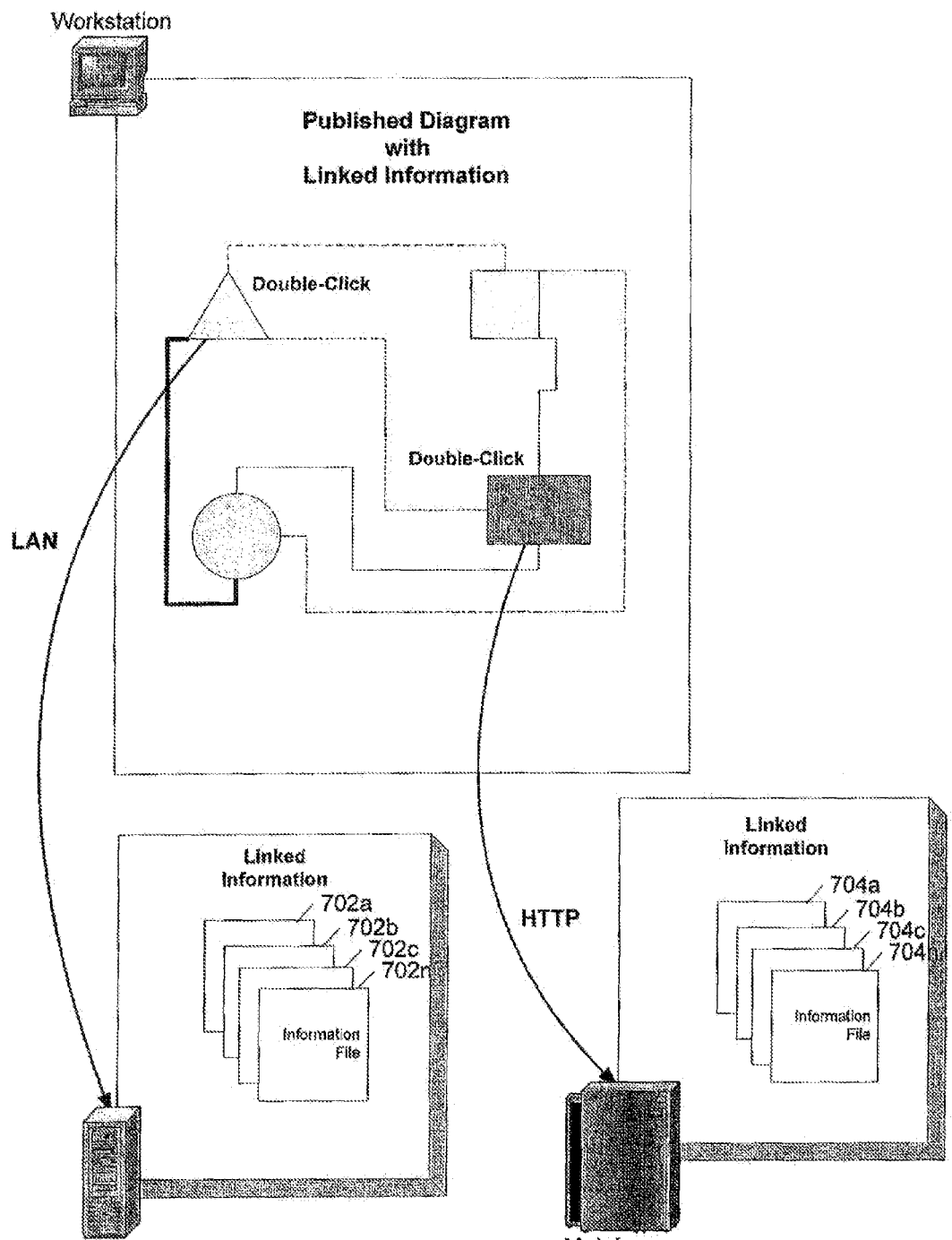
FIG. 7 shows a published diagram with different file locations.

FIG. 7 illustrates one embodiment 700 of a published diagram in accordance with the present invention. In this embodiment a published diagram 700 can show information from different file locations 702*a-n* and 704 *a-n*.

Figure 8:
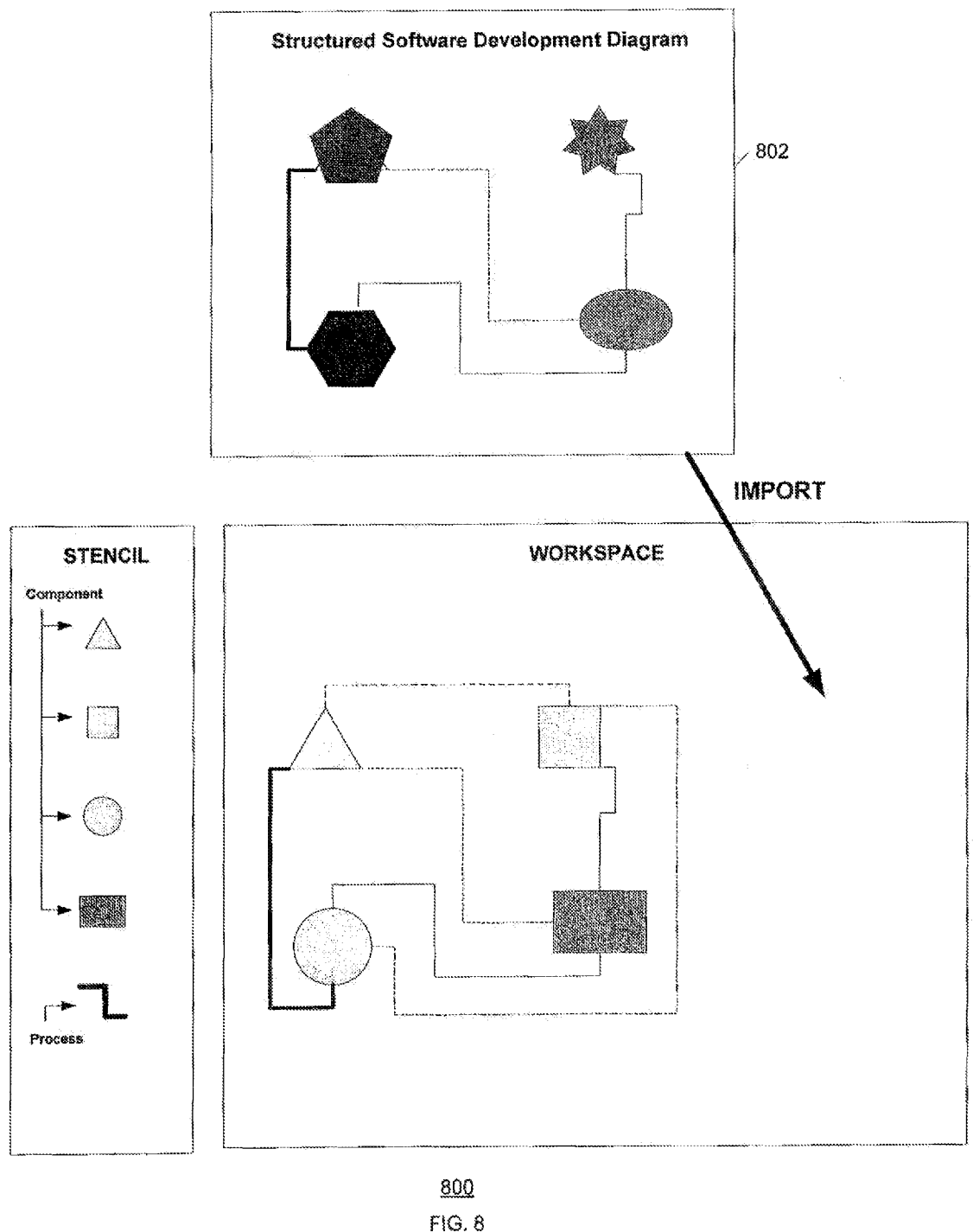
FIG. 8 illustrates importing a diagram from a structured development environment.
Figure 9:
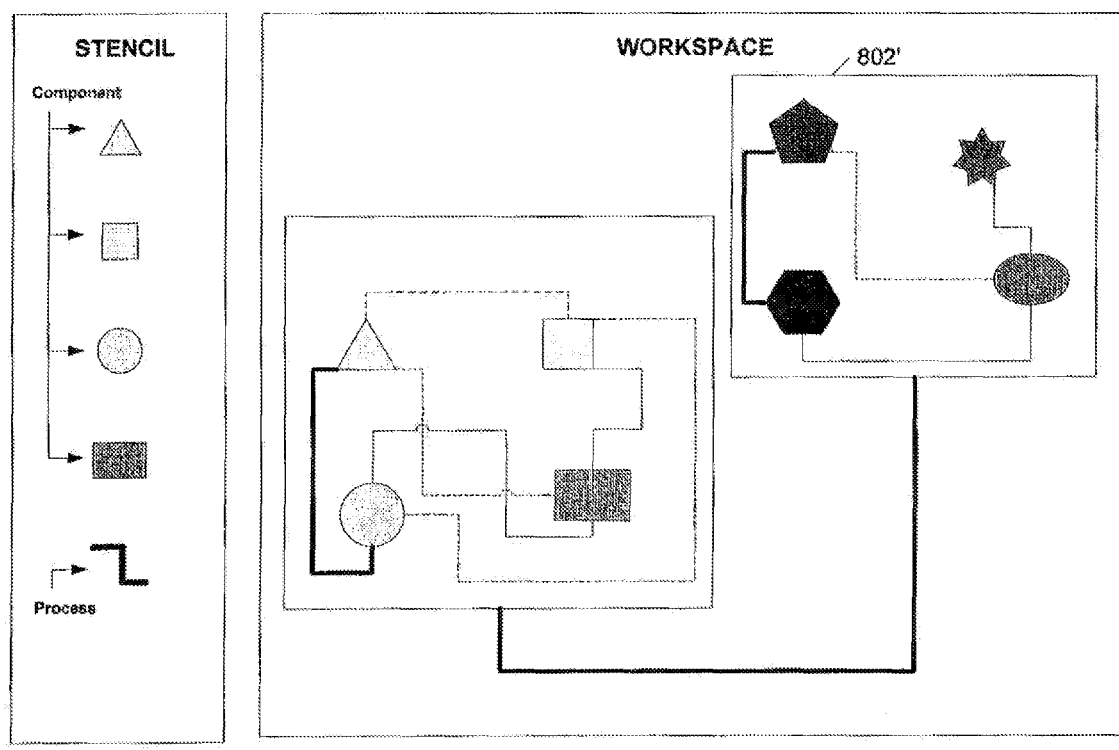
FIG. 9 illustrates multiple solutions represented in one diagram (after import).

FIGS. 8 and 9 illustrate another embodiment 800. In this embodiment it is possible to import a diagram 802 from a structured development environment.

Advantages

Using a typical software development team as an example, here are some ways this structure can help the different participants in the software development process:

Application developers: application developers will understand what they are working on, how it might affect other processes and ultimately how it will affect the user.

Quality assurance engineers: quality assurance engineers will understand where to look in order to identify the issues behind software bugs.

Information developers: information developers will have a map for a comprehensive information center which could be used to develop a definition of each component and how that component can be configured.

Curriculum developers: curriculum developers will have a map for building training materials and classes and for understanding what is needed in curriculum development.

Pro services: pro-services staff can understand and troubleshoot implementations.

Sales/technical sales: sales and technical sales staff can understand and map customer needs and tasks to specific areas for analysis.

Marketing: marketing staff can effectively describe their marketing responsibilities to customers.

Existing customers: existing customers will better understand the product, and how changes to a particular configuration might affect the product.

New customers: new customers will more quickly understand the product, how the product relates to their business needs and what is involved in getting the desired results from the product.

Software management: software management staff will know that this product information is available and that uncertainty on the part of any of the previously mentioned roles is minimized by this availability.

In the case of system oriented architecture (SOA) solutions, if each solution component is mapped in this manner, individual maps can simply be compiled, thereby very quickly making a huge solution manageably understandable. As a development tool, the map represents a new piece of a standard software development process to understand the effect new features will have on an entire project. The map can also be used as a check to see if proposed changes are actually implemented, and if they are not, how "what is" differs from what was proposed.

One or more of method steps described above can be performed by one or more programmable processes executing a computer program to perform functions by operating on input data and generating output. Generally, the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 10:
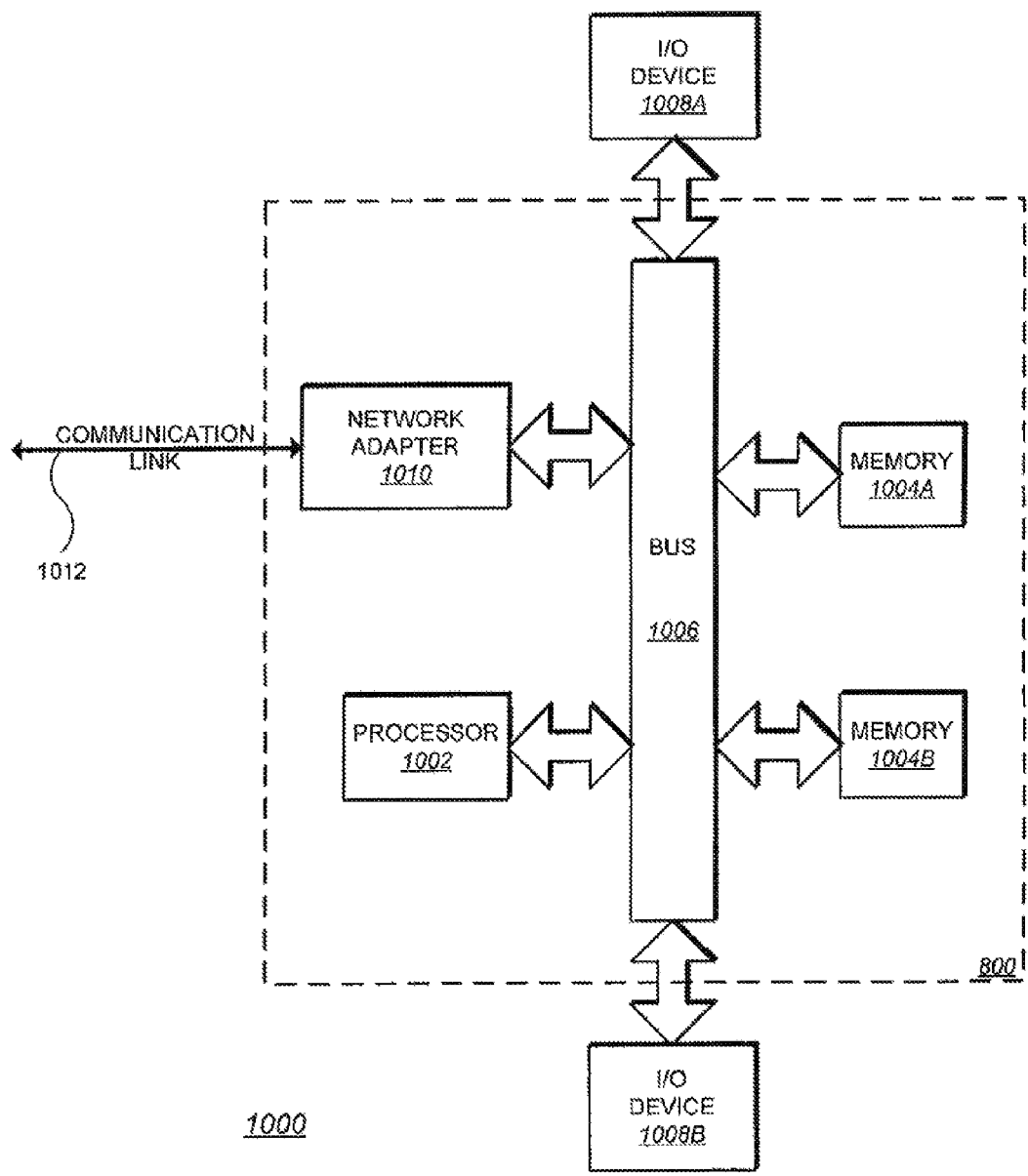
FIG. 10 illustrates a data processing system suitable for storing and/or executing program code.

FIG. 10 illustrates a data processing system 1000 suitable for storing and/or executing program code. Data processing system 1000 includes a processor 1002 coupled to memory elements 1004A-B through a system bus 1006. In other embodiments, data processing system 1000 may include more than one processor and each processor may be coupled directly or indirectly to one or more memory elements through a system bus.

Memory elements 1004A-B can include local memory employed during actual execution of the program code, bulk storage, and cache memories that provide temporary storage of at least some program code in order to reduce the number of times the code must be retrieved from bulk storage during execution. As shown, input/output or I/O devices 1008A-B (including, but not limited to, keyboards, displays, pointing devices, etc.) are coupled to data processing system 1000. I/O devices 1008A-B may be coupled to data processing system 1000 directly or indirectly through intervening I/O controllers (not shown).

In the embodiment, a network adapter 1010 is coupled to data processing system 1000 to enable data processing system 1000 to become coupled to other data processing systems or remote printers or storage devices through communication link 1012. Communication link 1012 can be a private or public network. Modems, cable modems, and ethernet cards are just a few of the currently available types of network adapters.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claim.

What is claimed is:

1. A computer-implemented method for providing a visual context for a software development process, the method comprising:

providing a unified architectural diagram, wherein the diagram links at least two kinds of information including standardized development architectural information and non-standardized development architectural information, the diagram including a storage and a stencil area representing components and links to different kinds of information, and for generating a unified view of each represented component, wherein the represented components and links are dragged and dropped into the storage area, wherein functionality of the diagram is enhanced by linking information to each of the represented components wherein there is a hierarchy of the software development process and links assigned to relevant information, and wherein a content of the software development process is published as a standard, wherein the diagram comprises a source map for delivering information to a wide audience and a series of focused maps, wherein a delivery method for each of the focused maps comprises a pointer to a specific Uniform Resource Locator (URL) path and a maintenance mechanism for maintaining the source map, and a mechanism for securing access to the source map and to the information linked in each focused map.

2. The computer-implemented method of claim 1 wherein the link is a pointer to a computer file path.

3. The computer-implemented method of claim 1 wherein the standard comprises a web-based standard.

4. The computer-implemented method of claim 3 wherein the diagram also allows for access to the source map and to information linked in each focused map.

5. The computer-implemented method of claim 3 wherein the audience comprise any of and any combination of application developers, quality assurance (QA) engineers, information developers, curriculum developers, pro-services, sales/technical sales representation, marketing, existing customers, new customers and software management.

6. The computer-implemented method of claim 1 wherein the unified architectural diagram comprises a published diagram with linked information.

7. A computer system for providing a visual context for a software development process, the system comprising:
   a database application; a processor; and a unified architectural diagram wherein the diagram:
      links at least two kinds of information including standardized development architectural information and non-standardized development architectural information, the diagram including a storage and stencil area representing components and links to different kinds of information; and
      generates a unified view of each represented component, wherein the represented components and links are dragged and dropped into the storage area, wherein the functionality of the architectural diagram is enhanced by linking information to each of the represented components wherein there is a hierarchy of the software development process and links assigned to relevant information; and
      publishes a content of the software development process as standard, wherein the diagram comprises a source map for delivering information to a wide audience and a series of focused maps, wherein a delivery mechanism for each of the focused maps comprises a pointer to a specific Uniform Resource Locator (URL) path and a maintenance mechanism for maintaining the source map, and a mechanism for securing access to the source map and to the information linked in each focused map.

8. The system of claim 7 wherein the link is a pointer to a computer file path.

9. The system of claim 7 wherein the standard comprises a web-based standard.

10. The computer-implemented method of claim 9 wherein the diagram also allows for access to the source map and to information linked in each focused map.

11. The computer-implemented method of claim 9 wherein the audience comprises any of and any combination of application developers, quality assurance (QA) engineers, information developers, curriculum developers, pro-services, sales/technical sales representation, marketing, existing customers, new customers and software management.

12. The computer-implemented method of claim 7 wherein the unified architectural diagram comprises a published diagram with linked information.

13. A computer program product including a computer readable storage medium storing a computer program, wherein the computer program is executed by a processor, the computer program comprising:
   computer program code for providing a unified architectural diagram, wherein the diagram links at least two kinds of information including standardized development architectural information and non-standardized development architectural information, the diagram including storage and a stencil area representing components and links do different kinds of information;
   computer program code for generating a unified view of each represented component, wherein the represented components and links can be dragged and dropped into the storage area, wherein the functionality of the architectural diagram is enhanced by linking information to each of the represented components wherein there is a hierarchy of the software development process and links assigned to relevant information; and
   computer program code for publishing a content of the software development process as a standard, wherein the diagram comprises a source map for delivering information to a wide audience and a series of focused maps, wherein a delivery mechanism for each of the focused maps comprises a pointer to a specific Uniform Resource Locator (URL) path and a maintenance mechanism for maintaining the source map, and a mechanism for securing access to the source map and to the information linked in each focused map.

14. The computer program product of claim 13 wherein the standard comprises a web-based standard.

15. The computer program product of claim 14 wherein the diagram also allows for access to the source map and to information linked in each focused map.

16. The computer program product of claim 14 wherein the audience comprises any of and any combination of application developers, quality assurance (QA) engineers, information developers, curriculum developers, pro-services, sales/technical sales representation, marketing, existing customers, new customers and software management.

\* \* \* \* \*